United States Patent
Barber et al.

(10) Patent No.: US 10,628,513 B2
(45) Date of Patent: Apr. 21, 2020

(54) PROVIDING ISOLATED EXTENSIBILITY FOR WEBPAGES WITH A UNIFIED MANIFEST AND OMNI-ACCESSIBLE PLATFORM SCRIPT

(71) Applicant: Microsoft Technology Licensing, LLC, Redmond, WA (US)

(72) Inventors: Timothy Daniel Barber, Snohomish, WA (US); Masato Maeda, Sammamish, WA (US); Hong Tao Chen, Sammamish, WA (US); Jyotirmaya Tripathi, Sammamish, WA (US); Rayman Faruk Aeron, Snohomish, WA (US); Ramesh Raman, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 31 days.

(21) Appl. No.: 15/961,853

(22) Filed: Apr. 24, 2018

(65) Prior Publication Data
US 2019/0325072 A1    Oct. 24, 2019

(51) Int. Cl.
*G06F 16/958*   (2019.01)
*H04L 29/08*    (2006.01)
(Continued)

(52) U.S. Cl.
CPC .............. *G06F 16/986* (2019.01); *G06F 8/35* (2013.01); *G06F 9/547* (2013.01); *H04L 67/02* (2013.01)

(58) Field of Classification Search
CPC .................................................. G06F 16/986
(Continued)

(56) References Cited

U.S. PATENT DOCUMENTS 9,032,066 B1 *  5/2015  Erdmann ............... G06F 21/53
                                              709/224
9,607,332 B1 *  3/2017  Nazarov ............ G06Q 30/0631
(Continued)

OTHER PUBLICATIONS

"HTML Standard", Retrieved from <<https://htmt.spec.whatwg.org/multipage/web-messaging.html#dom-window-postmessage>>, Retrieved on Feb. 7, 2018, 10 Pages.
(Continued)

*Primary Examiner* — Frank D Mills
(74) *Attorney, Agent, or Firm* — Watson Patents, PLC; Vladan M. Vasiljevic

(57) ABSTRACT

To provide isolated extensibility for webpages, thereby enabling webpages to provide additional functionality supported by instructions whose execution is independent of execution of the instructions of the webpage, a unified manifest is utilized which comprises information regarding each of the extensions that can extend the functionality of the webpage, and a common extensibility platform script is invoked that provides the setup functionality to support such isolated extensibility. The extensibility platform script can be utilized by each extension thereby centralizing the relevant extension instantiation functionality. To provide for a unified manifest, a manifest associated with one extension can be copied into a manifest associated with another extension if the first extension indicates that it is capable of extending the second extension, or if the first extension is actually invoked by the second extension. Such a copy can occur when the extensions and their corresponding manifests are uploaded onto a server.

20 Claims, 6 Drawing Sheets

(51) Int. Cl.
G06F 9/54 (2006.01)
G06F 8/35 (2018.01)

(58) Field of Classification Search
USPC .......................................................... 715/240
See application file for complete search history.

(56) References Cited

U.S. PATENT DOCUMENTS

| | | | |
|---|---|---|---|
| 2011/0093527 | A1 | 4/2011 | Doyle |
| 2013/0191880 | A1* | 7/2013 | Conlan ............... H04L 63/20 726/1 |
| 2015/0242526 | A1 | 8/2015 | Dingwall et al. |
| 2015/0281318 | A1* | 10/2015 | Warner ............... H04L 67/02 709/217 |
| 2018/0052811 | A1* | 2/2018 | Gonzalez del Solar ..................... G06F 17/211 |

OTHER PUBLICATIONS

Batenburg, Patrick, "Patrick-Batenburg/GoogleChromeThemeCreationGuide", Retrieved from <<https://github.com/PatrickBatenburg/GoogleChromeThemeCreationGuide/blob/master/README.md>>, May 18, 2017, 11 Pages.

Bauer, et al., "Formal Analysis and Run-Time Monitoring of Information Flows in Chromium: Technical Appendix", In Technical Report CMU-CyLab-14-015, Feb. 1, 2015, 104 Pages.

Crouch, et al., "Window.postMessage()", Retrieved from <<https://developer.mozilla.org/en-US/docs/Web/API/Window/postMessage>>, Retrieved on Feb. 9, 2018, 6 Pages.

Dhawan, Mohan, "Rethinking Web Platform Extensibility", A Dissertation Submitted to the Graduate School in Partial Fulfillment of the Requirements for the Degree of Doctor of Philosophy, May 2013, 152 Pages.

Gertner, Matthew, "Creating Custom Firefox Extensions with the Mozilla Build System", Retrieved from <<https://developer.mozilla.org/en-US/docs/Archive/Add-ons/Creating_Custom_Firefox_Extensions_with_the_Mozilla_Build_System>>, Jul. 26, 2005, 18 Pages.

Whitney, et al., "Create and Host an App Extension", Retrieved from <<https://docs.microsoft.com/en-us/windows/uwp/launch-resume/how-to-create-an-extension>>, Oct. 5, 2017, 16 Pages.

Zuzak et al, "Cross-context Web Browser Communication with Unified Communication Models and Context Types" MIPRO 2011—CTS track, Proceedings of the 34th International Convention (2011).

* cited by examiner

US 10,628,513 B2

PROVIDING ISOLATED EXTENSIBILITY FOR WEBPAGES WITH A UNIFIED MANIFEST AND OMNI-ACCESSIBLE PLATFORM SCRIPT

BACKGROUND

Modern computer software application development, for applications that will execute within a traditional desktop application context, is typically performed utilizing computer software development tools that provide for independence between two or more sets of computer-executable instructions. Such independence allows the overall traditional desktop application to continue to operate even when a subcomponent experiences a failure, thereby enabling a user to more gracefully restart the desktop application, or otherwise keep using the desktop application. Modern desktop application software development tools provide for independent application domains, and other like mechanisms to isolate individual desktop applications, or components of a single common desktop application, from one another so that they do not affect each other, especially within the context of a failure of one preventing the proper operation of others. No such mechanisms exist for the development of web-based applications, and, consequently, should the computer-executable instructions of one aspect a webpage fail, they can negatively impact all of the other functionality provided by that web page.

SUMMARY

To provide isolated extensibility for webpages, thereby enabling webpages to provide additional functionality supported by instructions whose execution is independent of execution of the instructions of the webpage, a unified manifest can be utilized which can comprise information regarding each of the extensions that can extend the functionality of the webpage, and a common extensibility platform script can be invoked that can provide the setup functionality to support such isolated extensibility. The extensibility platform script can be utilized by each extension, including the initial invoking webpage itself, which, in one paradigm, can be treated as an extension, thereby centralizing the relevant extension instantiation functionality. To provide for a unified manifest, a manifest associated with one extension can be copied into a manifest associated with another extension if the first extension indicates that it is capable of extending the second extension, or if the first extension is actually invoked by the second extension. Such a copy can occur when the extensions and their corresponding manifests are uploaded onto a server. Each extension can be its own webpage which can be invoked in an inline frame within another webpage, and an extension's domain can differ from the domain of an invoking webpage.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
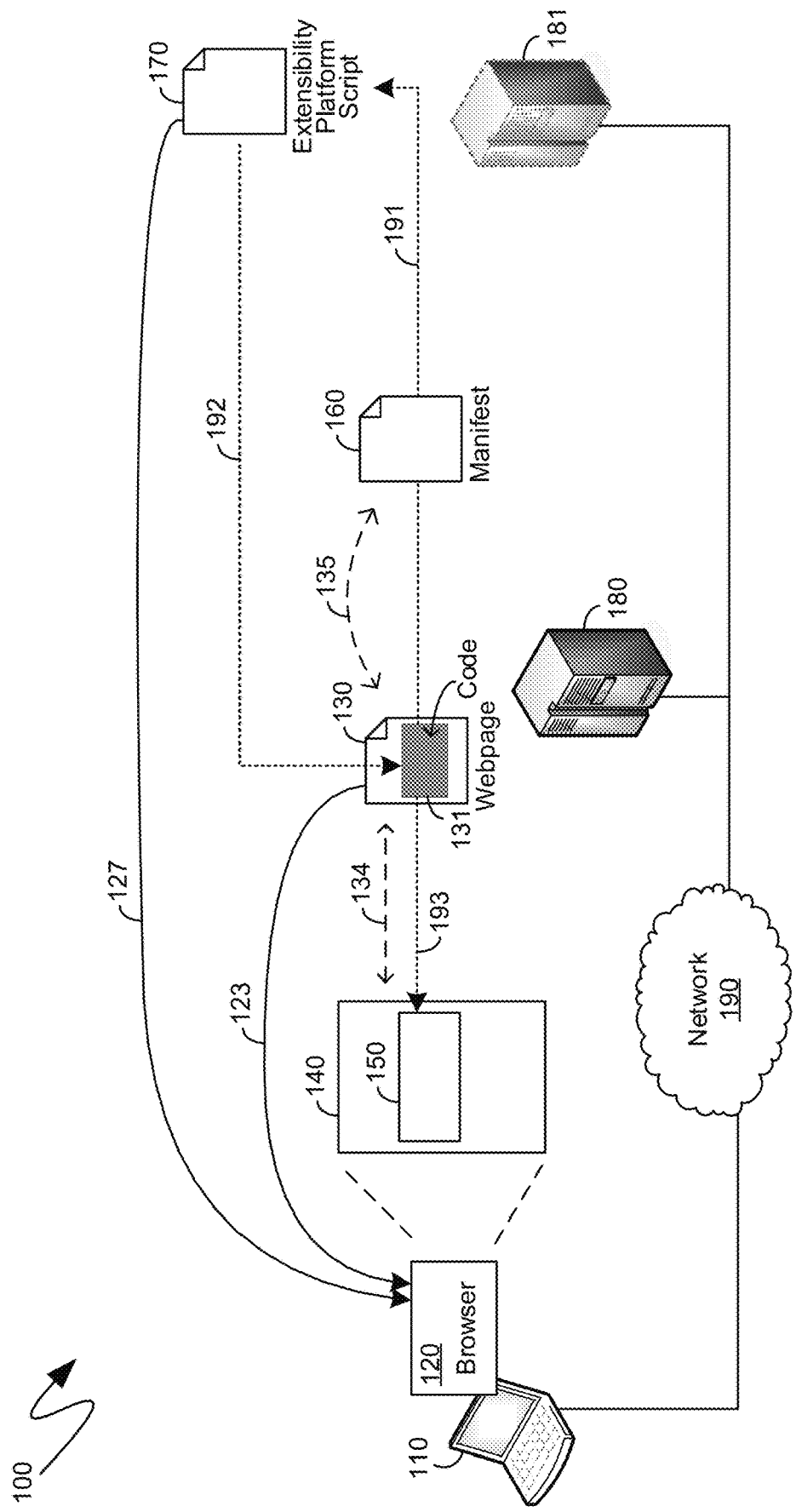
FIG. 1 is a system diagram of an exemplary system utilizing an omni-accessible platform script providing isolated extensibility for webpages.

The following description relates to enabling independently executing extensions within webpages, thereby enabling webpages to extend their functionality while maintaining the failure resilience and other benefits associated with code independence. To provide isolated extensibility for webpages, thereby enabling webpages to provide additional functionality supported by instructions whose execution is independent of execution of the instructions of the webpage, a unified manifest can be utilized which can comprise information regarding each of the extensions that can extend the functionality of the webpage, and a common extensibility platform script can be invoked that can provide the platform functionality to support such isolated extensibility. The extensibility platform script can be utilized by each extension, including the initial invoking webpage itself, which, in one paradigm, can be treated as an extension, thereby centralizing the relevant extension instantiation functionality. To provide for a unified manifest, a manifest associated with one extension can be copied into a manifest associated with another extension if the first extension indicates that it is capable of extending the second extension, or if the first extension is actually invoked by the second extension. Such a copy can occur when the extensions and their corresponding manifests are uploaded onto a server. Each extension can be its own webpage which can be invoked in an inline frame within another webpage, and an extension's domain can differ from the domain of an invoking webpage.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including servers, hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

With reference to FIG. 1, an exemplary system 100 is illustrated, providing context for the descriptions below. The exemplary system 100 of FIG. 1 illustrates a browser application program 120 executing on a computing device 110 and displaying a webpage 130 in the form of a displayed webpage 140. The exemplary browser application program 120 can be a ubiquitous web browser application program, or any other type of application program that can obtain and render a webpage, such as the exemplary webpage 130. The exemplary webpage 130 can be stored on one or more computer readable media communicationally coupled to a computing device, such as the exemplary computing device 180, which can act as a host for the exemplary webpage 130. The displayed webpage 140 can comprise visual elements, and can behave and function in a manner, defined by the webpage 130, including the exemplary webpage code 131. The dashed arrow 134 indicates the correspondence between the webpage 130, as a file or other like data construct stored on a computer readable storage medium of a hosting server, such as the exemplary server 180, and the displayed webpage 140 that is rendered by a browser application program, such as the exemplary browser 120.

The exemplary webpage 130 can comprise computer-executable instructions in the form of the exemplary webpage code 131. Such webpage code 131 can comprise scripts, either directly enumerated within the webpage 130, or linked to by the webpage 130, which can be executed by the exemplary browser 120 when the web page 130 is obtained by the browser 120. Within FIG. 1, the obtaining of the webpage 130, by the browser 120, such as by downloading one or more HTML files that comprises a webpage 130, is illustrated by the communication 123. The webpage code 131 can facilitate a user's interaction with the webpage 130, including dynamically altering the displayed webpage 140 in response to user interaction, such as via the computing device 110.

While the functionality exposed to a user by the webpage 130 can be complex, such that the webpage 130 can even mimic one or more desktop application programs, the webpage code 131 providing such functionality does not have code independence. More specifically, were one aspect of the webpage 130 to fail, such as a subroutine of the webpage code 131 crashing or hanging, all of the functionality provided by the webpage 130 can be impacted, and the user may be forced to either reload the webpage 130, or to quit to the browser 120 and then reload the webpage 130. The lack of code independence does not enable some functionality provided by the webpage 130 to continue to operate properly when other functionality is negatively impacted, such as by a crash, hanging, or other like undesirable consequence.

Webpages, such as the exemplary webpage 130, can utilize inline frames to host content from, for example, other webpages, inline within the webpage display. For example, the exemplary webpage display 140 shows an inline frame 150 in which content from another webpage can be displayed by the exemplary browser 120. An inline frame can provide for some measure of code independence. For example, if the webpage whose content was being displayed within the exemplary inline frame 150 stopped functioning, such as, for example, if code within that webpage crashed such that the display of that webpage, within the exemplary inline frame 150, was no longer responsive to user input, the remainder of the webpage display 140 could remain properly operational and allow the user to interact with the remainder of the webpage display 140. However, communication between the exemplary webpage code 131 and code of a webpage that was instantiated within the inline frame 150 can be tedious and limited in functionality. More specifically, such communications can entail the use of cross-document messages, which can require that both the sending and receiving webpages comprise code that establishes mechanisms that will receive such cross-document messages. Consequently, communication between two or more inline frames within a single webpage is not possible absent mechanisms to establish common communicational contexts. While the precise mechanism for invoking and establishing an inline frame is orthogonal to the mechanisms described here, the mechanisms described herein are compatible with inline frames conforming to the HTML IFRAME tag and corresponding implementations.

According to one aspect, a unified manifest and an omni-accessible platform script can facilitate the invocation of multiple different extensions that can extend the functionality of a webpage, such as the exemplary webpage 130, by facilitating the insanitation of such extensions within inline frames. Such extensions can be webpages or other hosted computer-executable instructions that can be executed by the exemplary browser 120 while maintaining code independence from other extensions. As utilized herein, the term "extension" applies equally to the webpage 130 itself, which can simply be a specific type of extension, namely a "root" extension or "shell".

To utilize an omni-accessible platform script, such as the exemplary extensibility platform script 170, the exemplary webpage 130 can be associated with a manifest, such as the exemplary manifest 160. Within the exemplary system 100 of FIG. 1, the association between the exemplary webpage 130 and the exemplary manifest 160 is illustrated by the dashed arrow 135. The exemplary manifest 160 can comprise an enumeration of the extensions that are utilized, either directly or indirectly, by the webpage 130. As will be detailed further below, the exemplary manifest 160 can be constructed in a bottom-up manner when the webpage 130 is uploaded to the server 180 to be hosted thereby, or at another like time. For each extension enumerated in the exemplary manifest 160, such an enumeration can comprise an identification of the extension itself, such as a unique identifier, information regarding a host of the extension, such as a uniform resource locator of a server hosting the extension, a path, relative to some previously established, or explicitly enumerated, host, from which the extension can be obtained and instantiated, and an identification, such as with a unique identifier, name, or combinations thereof, of a target extension that the identified extension can extend.

According to one aspect, to extend the functionality provided by the webpage 130, webpage code 131 can, in addition to providing a first set of functionality, also invoke the extensibility platform script 170. The extensibility platform script can be hosted by the same server computing device hosting the webpage 130, such as the exemplary server 180, or it can be hosted by a different server computing device, including server computing devices in different domains, such as the exemplary server computing device 181. Upon invoking the extensibility platform script 170, the webpage code 131 can provide, to the extensibility platform script 170, the exemplary manifest 160, as illustrated by the action 191. In response, as will be detailed further below, the extensibility platform script 170 can return, as illustrated by the return communication 192, a listing of extensions that can extend the webpage 130, as determined from the manifest 160. The exemplary webpage code 131 can utilize the functionality of the extensibility platform script 170 to instantiate one such extension into an inline frame, such as the exemplary inline frame 150, as illustrated by the communication 193. Because the extensibility platform script 170 can be in the form of script instructions that can be executed by a browser application program, according to one aspect, invocation of the extensibility platform script 170, by the webpage code 131, can entail the obtaining of the extensibility platform script 170, by the browser 120, as illustrated by the communication 127. More specifically, while parsing the webpage 130, including executing the webpage code 131, the browser 120 can be directed to obtain the extensibility platform script 170, as illustrated by the communication 127, and the browser 120 can thereafter execute the computer-executable instructions, such as the scripts, found therein. Thus, the communication 191, whereby the webpage code 131 invokes the extensibility platform script 170 and provides to it the manifest 160 for subsequent utilization by the extensibility platform script 170, can entail the browser 120 variously executing portions of the scripts of the webpage code 131 and the scripts of the extensibility platform script 170 in an alternating or parallel manner.

Figure 2:
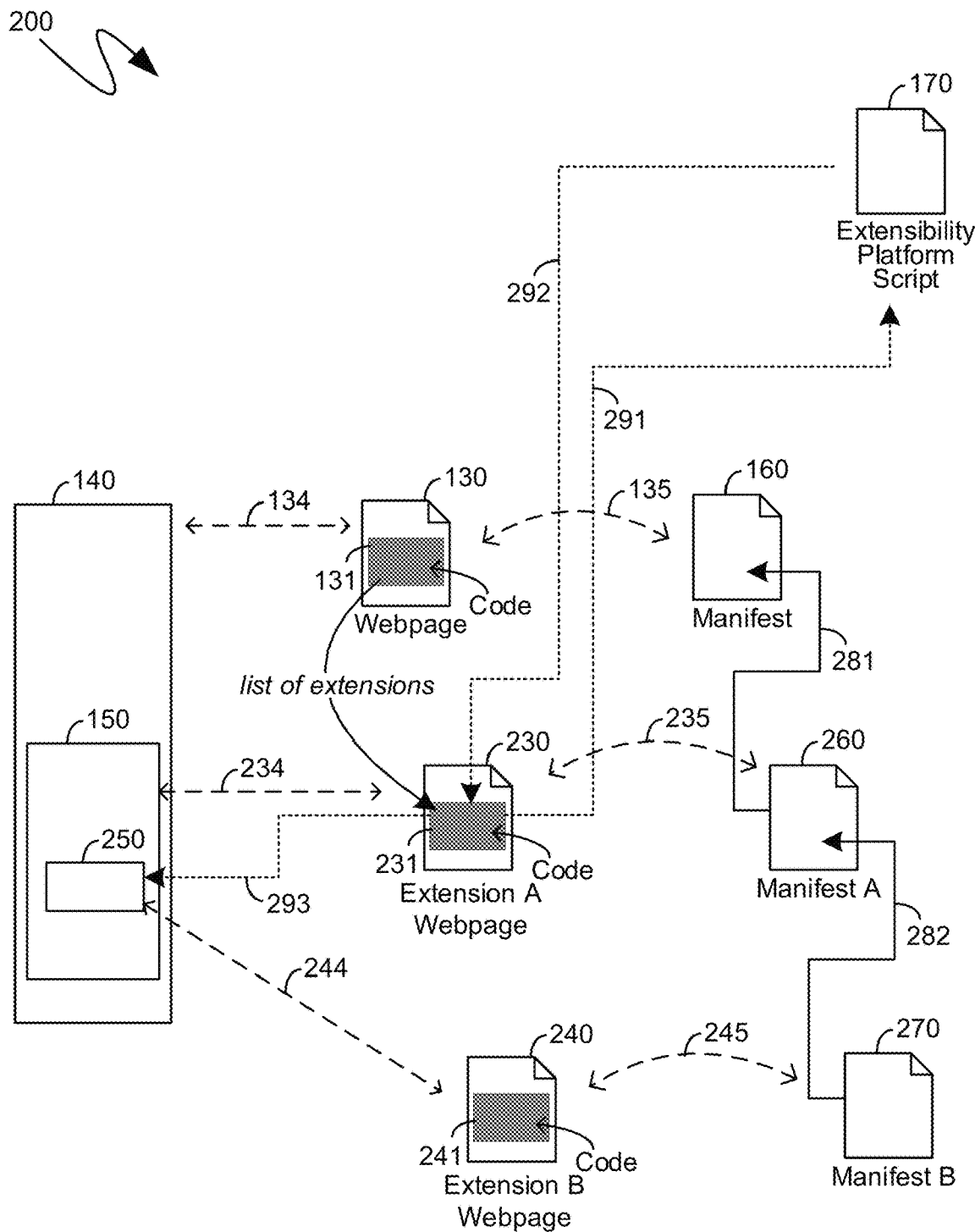
FIG. 2 is a system diagram of an exemplary system generating a unified manifest for providing isolated extensibility for webpages.

Prior to detailing the utilization of the extensibility platform script 170, the manifest 160 is described in greater detail with reference to FIG. 2. Turning to FIG. 2, the system 200 shown therein illustrates an exemplary utilization of the manifest 160 and the extensibility platform script 170 to instantiate multiple extensions within a single webpage, including multiple nested extensions, or extensions within extensions. For example, in the exemplary system 200 shown in FIG. 2, the webpage display 140 corresponding, as illustrated by the dashed arrow 134, to the content of the webpage file 130, can comprise an inline frame that can have instantiated within it an extension which can, itself, be in the form of a webpage. Thus, continuing with such an example, the exemplary web page 230 can comprise scripts or other like webpage code 231 that can provide a set of functionality. Such functionality can enable the webpage 230, when it instantiated within the inline frame 150, to extend the functionality of the webpage 130 that is being displayed as the webpage display 140. In addition to displaying content, and allowing user interaction therewith, within the inline frame 150, the webpage code 231 can exchange cross-document messages with the webpage code 131, and vice-versa, thereby enabling the webpage 230 to further extend the functionality offered by the webpage 130. By way of a simple example, the webpage 130 can provide the operating, or status, information of multiple different systems. In such an example, the webpage 130 can provide an overall display paradigm for such information, and can aggregate various information to display aggregated totals. However, because each system whose operating, or status, information is being provided can be separately maintained, it may be inefficient to incorporate, into the webpage 130, webpage code 131 that is capable of communicating with each such independent system because, if one system were to change the manner or communicational format it utilizes to report operating, or status, information, the entire webpage 131 may have to be changed. Instead, multiple different webpages can be separately created and can, therefore, be separately maintained, each of which can comprise webpage code that is designed to communicate only with a single system. If one system were to, then, change the manner in which it provides operating, or status, information, or were to change the type of information provided, only a single webpage would need to be updated, namely the webpage associated with that one system. Continuing with such an example, the webpage code 231 of the exemplary webpage 230 can communicate with a specific system and can display that system's operating, or status, information within the inline frame 150. Additionally, through cross-document messaging, the webpage code 131 can obtain, from the webpage code 231, relevant information regarding the system with which the exemplary webpage 230 is associated, thereby enabling the webpage code 131 to aggregate the obtained information with information obtained from other systems and, thereby, enable the display of aggregated information. Such cross-document messaging with webpage code being executed within an inline frame context, therefore, extends the functionality offered by the webpage 130 while maintaining code independence between, for example, the code 131 of the webpage 130 and code 231 of the extension, namely the webpage 230 in the illustrated exemplary system 200.

Cross-document messaging can be performed between a hosting extension and an extension being hosted by the hosting extension, such as between the webpage 130 and the webpage 230, as exemplified by the example above, and also between two extensions that are hosted by the same hosting extension. Additionally, there can be multiple levels of hosted extensions, with a hosted extension in turn acting as a hosting extension and hosting its own hosted extension. Thus, for example, the webpage 230, which can be invoked as an extension for the webpage 130, can, itself, invoke an extension, such as in the form of the exemplary webpage 240, for which the webpage code 231, of the webpage 230, can create an inline frame, such as the exemplary inline frame 250, and utilize the extensibility platform script 170 to instantiate the webpage 240 in the inline frame 250. More specifically, once the extension, in the form of the exemplary webpage 230, is instantiated into the inline frame 150, such as by the webpage code 131 invoking the extensibility platform script 170 in the manner described above and illustrated by the exemplary system 100 of FIG. 1, the webpage code 231, of the webpage 230 that is the instantiated extension can, itself, call the same extensibility platform script 170, which the browser (not shown) can have already obtained and can already be executing, or can already have executed.

Thus, as illustrated in the exemplary system 200 of FIG. 2, the exemplary webpage code 231 can invoke the extensibility platform script 170, as illustrated by the communication 291, and can receive, in response to either an implicit or explicit request, as detailed above, a list of extensions that have indicated that they can extend the webpage 230, such a response being illustrated by the exemplary response of communication 292. The listing of the extensions can be made by the enumerating, to the webpage code 231, those extensions in the manifest 160 which can have been previously provided to the extensibility platform script 170 in the manner detailed above. The webpage 230 can then request that the extensibility platform script 170 instantiate its own extension, such as the exemplary webpage 240 within an inline frame 250 that the webpage 230 can create.

As detailed above, the webpage 130 can be associated with a manifest 160, as illustrated by the association 135. In a similar manner, the webpage 230 can be associated with its own manifest, such as the exemplary manifest 260, as illustrated by the association 235, and the webpage 240 can be associated with the manifest 270, as illustrated by the association 245. According to one aspect, when the webpage 130 is uploaded to a hosting server, computer-executable instructions executing on such a server, or hosting platform, can update the manifest 160 to include the information from the manifests associated with the extensions that are invoked by the webpage 130. Consequently, such computer-executable instructions can be executed to parse the webpage 130 and identify, for example, the invocation of the extension represented by the webpage 230. Subsequently, such computer-executable instructions can identify the manifest 260 that is associated with the webpage 230 and copy the contents of the manifest 260 into the manifest 160, as illustrated by the copy action 281. Upon completion of the copying of information from manifests of extensions, such as the manifest 260, into the manifest of the shell webpage, such as the manifest 160, only a single manifest, namely the manifest 160, need be provided to the extensibility platform script 170. In a like manner, the manifest 260 associated with the webpage 230 can, itself, have already been updated to include the content of manifests of extensions invoked by the webpage 230. Thus, for example, upon upload of the webpage 230 to a hosting platform, such as prior to the upload of the webpage 130 to another, or the same, hosting platform, computer-executable instructions being executed by the hosting platform hosting the webpage 230 can have parsed the webpage 230 and can have identified an invocation of an extension, such as the webpage 240. Subsequently, such computer-executable instructions can have identified the manifest 270 as being associated with the webpage 240 and can have copied the contents of the manifest 270 into the manifest 260, as illustrated by the copy action 282. Thus, when the contents of the manifest 260 are copied into the manifest 160, in the manner described previously and illustrated by the copy action 281, the manifest 260 can already comprise the contents of the manifest 270, and, consequently, the manifest 160 can ultimately comprise the contents of both the manifests 260 and 270.

Figure 3:
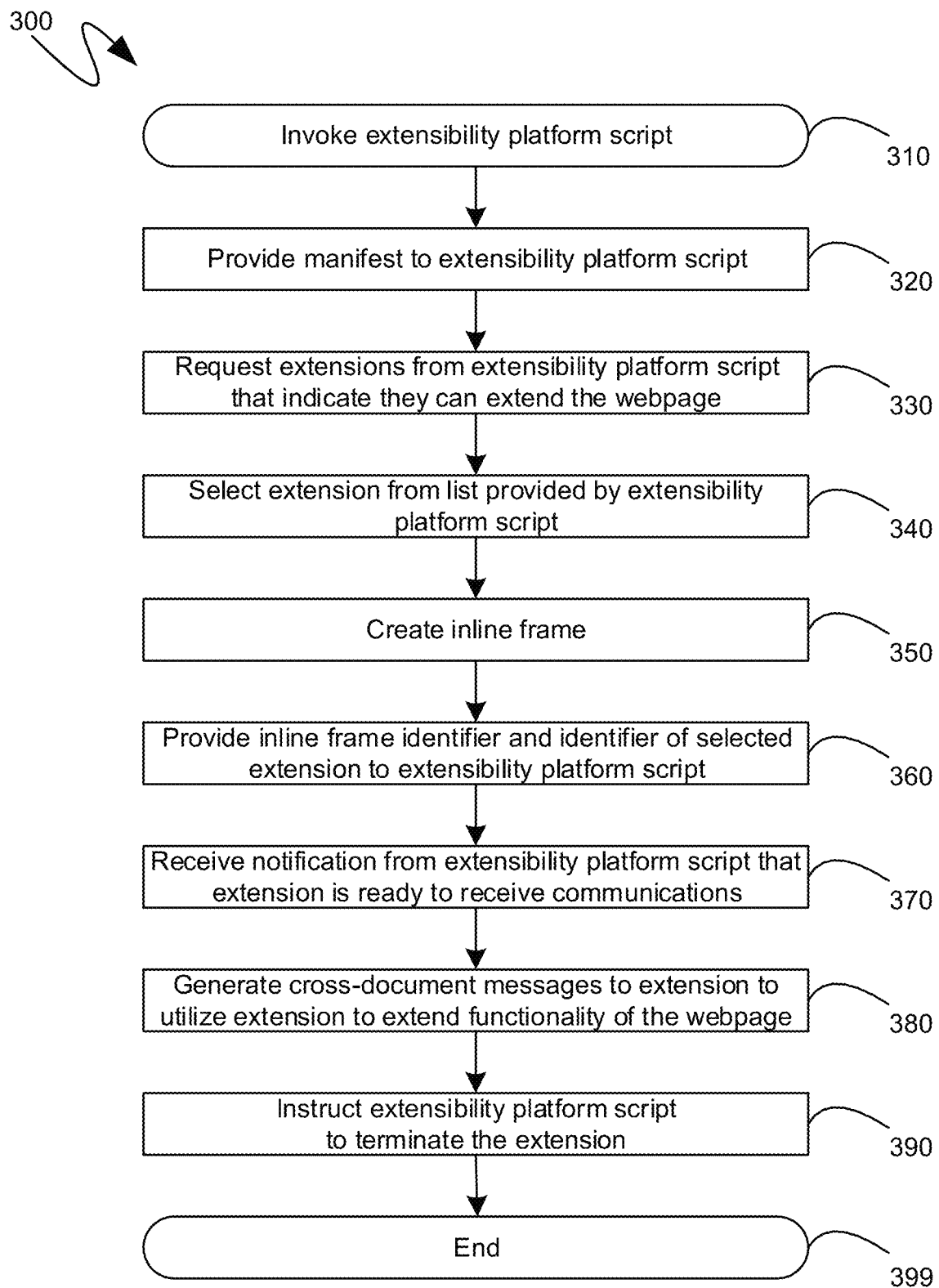
FIG. 3 is a system diagram of communications between isolated extensions.

Turning to FIG. 3, the exemplary flow diagram 300 shown therein illustrates an exemplary series of steps that can be codified in webpage code, to be executed by a browser, causing the browser to utilize an extensibility platform script to facilitate the invocation of extensions that extend the functionality of the webpage in a manner that maintains code independence. Initially, at step 310, the extensibility platform script can be invoked, such as by specifying the location from which the extensibility platform script can be obtained by the browser and parsed thereby to execute the script contained therein. Subsequently, at step 320, the manifest associated with the shell, or root, webpage can be provided by the webpage code to the extensibility platform script, and, at step 330, the webpage code can request that the extensibility platform script provide a list of extensions enumerated in the manifest, that was provided at step 320, that identify the webpage and, thereby, indicate that they are capable of extending the webpage. Once such a list is received from the extensibility platform script, processing can proceed to step 340, at which point one of those extensions can be selected. Subsequently at step 350 an inline frame can be created and, at step 360, an identifier of the created inline frame, together with an identification, such as unique identifier, of the extension selected at step 340, can be provided to the extensibility platform script as part of a request to have the extensibility platform script instantiate the identified extension within the identified inline frame. An identification of the inline frame can be in the form of a document object model identifier that identifies the document object model object corresponding to the inline frame.

By providing an omni-accessible script that can facilitate the identification, instantiation, use and ultimate determination of extensions to webpage functionality, and thereby provide platform-like functionality, the provision of additional functionality in a code independent manner is made easier to implement. Thus, it can be the extensibility platform script that performs the instantiation of an extension, as will be detailed further below, and facilitates the establishment of a communicational connection therewith. Consequently, once the extensibility platform script has completed instantiating the requested extension into the provided inline frame, it can provide a notification, such as can be received at step 370, indicating that the extension is ready to receive cross-document communications. At step 380, such cross-document communications can be generated to utilize the extension to extend the functionality of the webpage while maintaining code independence. The precise formatting of such cross-document communications can be based on a communicational contract established between the webpage code and the code of the extension by the creators or programmers of such code. Once the functionality provided by the extension is no longer needed, the webpage code can instruct the extensibility platform script to terminate the extension, as indicated at step 390. The relevant processing performed by the browser's execution of the webpage code, in so far as the utilization of this extension, can then end at step 399.

Figure 4:
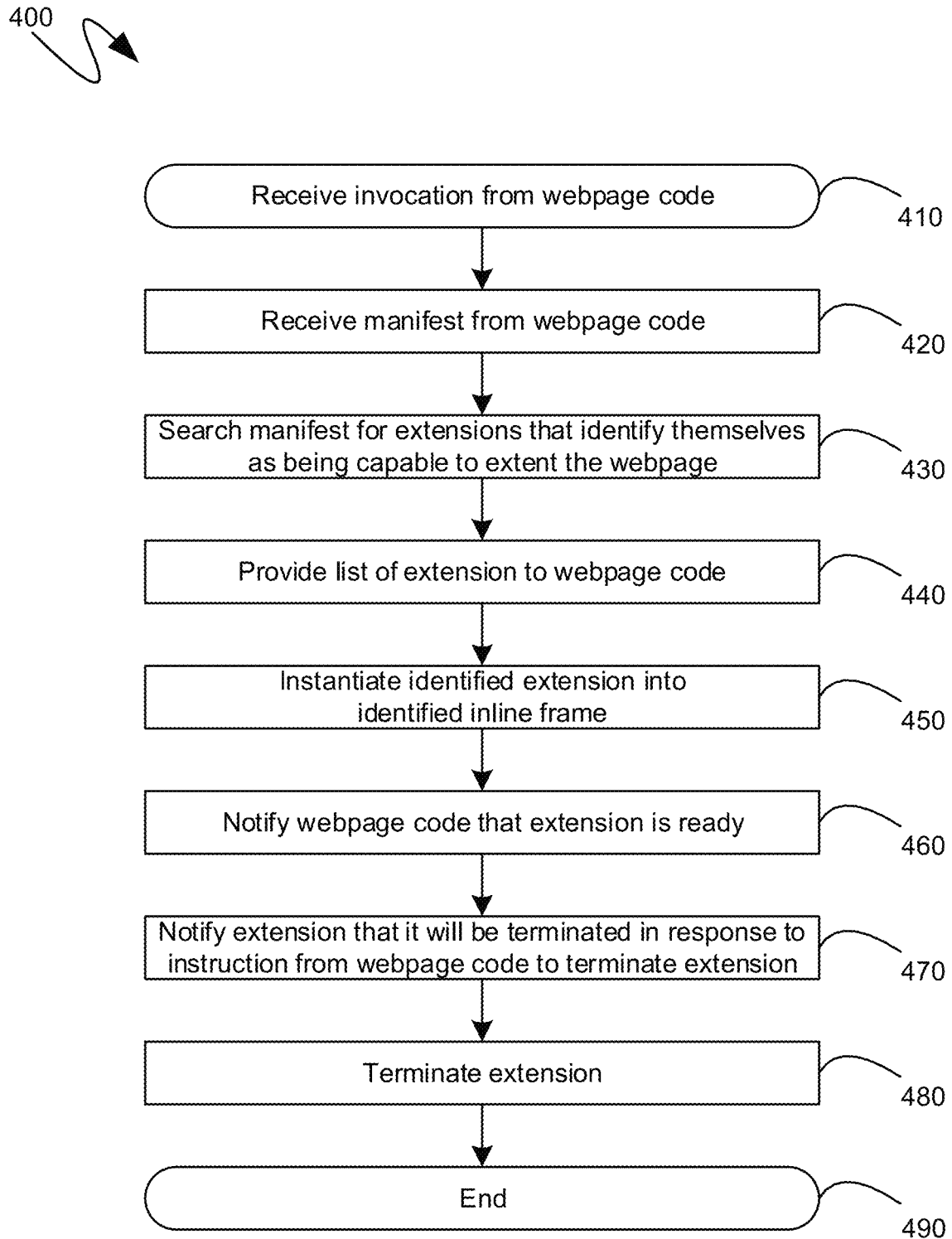
FIG. 4 is a flow diagram of an exemplary series of steps for utilizing an omni-accessible platform script to invoke isolated extensibility from a webpage.

Turning to FIG. 4, the exemplary flow diagram 400 shown therein illustrates an exemplary series of steps that can be performed by the extensibility platform script. Initially, at step 410, the extensibility platform script can be invoked by webpage code, which can commence the execution of the extensibility platform script by a browser. Subsequently, at step 420, a root manifest can be provided that can enumerate extensions. At step 430, the execution of the manifest code, by a web browser, can, either in response to a request, or proactively, search the manifest provided at step 420 for extensions that identify themselves as being able to extend the webpage whose code invoked the extensibility platform script. For example, the manifest can comprise information regarding each extension, and such information can include, for each extension, an identifier of the webpages that such an extension can extend. Once the extensions are found, at step 430, a list of such extensions can be provided to the webpage code at step 440.

In response to a request from the webpage code, the extensibility platform script can instantiate an identified extension into an identified inline frame at step 450. More specifically, the extensibility platform script can retrieve the identified extension from the domain, path, and other like network location information specified in the manifest and open such a network location in the inline frame. Additionally, if appropriate, the extensibility platform script can instruct the extension to establish data structures, objects, or other like mechanisms by which to communicate via cross-document messaging, or optionally verify the ability of the extension to send and receive cross-document messages, such as by sending a cross-document ping. At step 460, once the extension is ready to receive cross-document messages, the extensibility platform script can notify the calling webpage that the extension is ready. Subsequent communications between the calling webpage and the extension can proceed in an agreed-upon format that can be part of the contract, or common understanding, established between the programmers, or developers, of the webpage and the programmers, or developers, of the extension. At some point in time, once the webpage no longer has need of the functionality provided by the extension, it can request that the extensibility platform script terminate the extension. Upon receiving such a request, the extensibility platform script can notify the extension that will be terminated, at step 470. This can allow the extension to clear caches for other like memory locations, as well as appropriately end any ongoing processing. At step 480 extension can be terminated. According to one aspect, the extension may not be allowed to prevent a termination, and, as such, step 480 can occur without waiting for agreement, or other acquiescence, from the extension. At step 490 the relevant processing of the extensibility platform script with respect to the extension can end.

Although illustrated with reference to a single invoking webpage, such as a root webpage, or shell, the steps of the exemplary flow diagram 400, in particular steps 430 through 480, can be repeated by the shell to invoke other extensions, or by other extensions themselves to invoke still further extensions of those extensions. In each instance, the searching performed at step 430 can be to find and list those extensions that have identified themselves as being able to extend the extension that requested the list that will be provided at step 440.

Figure 5:
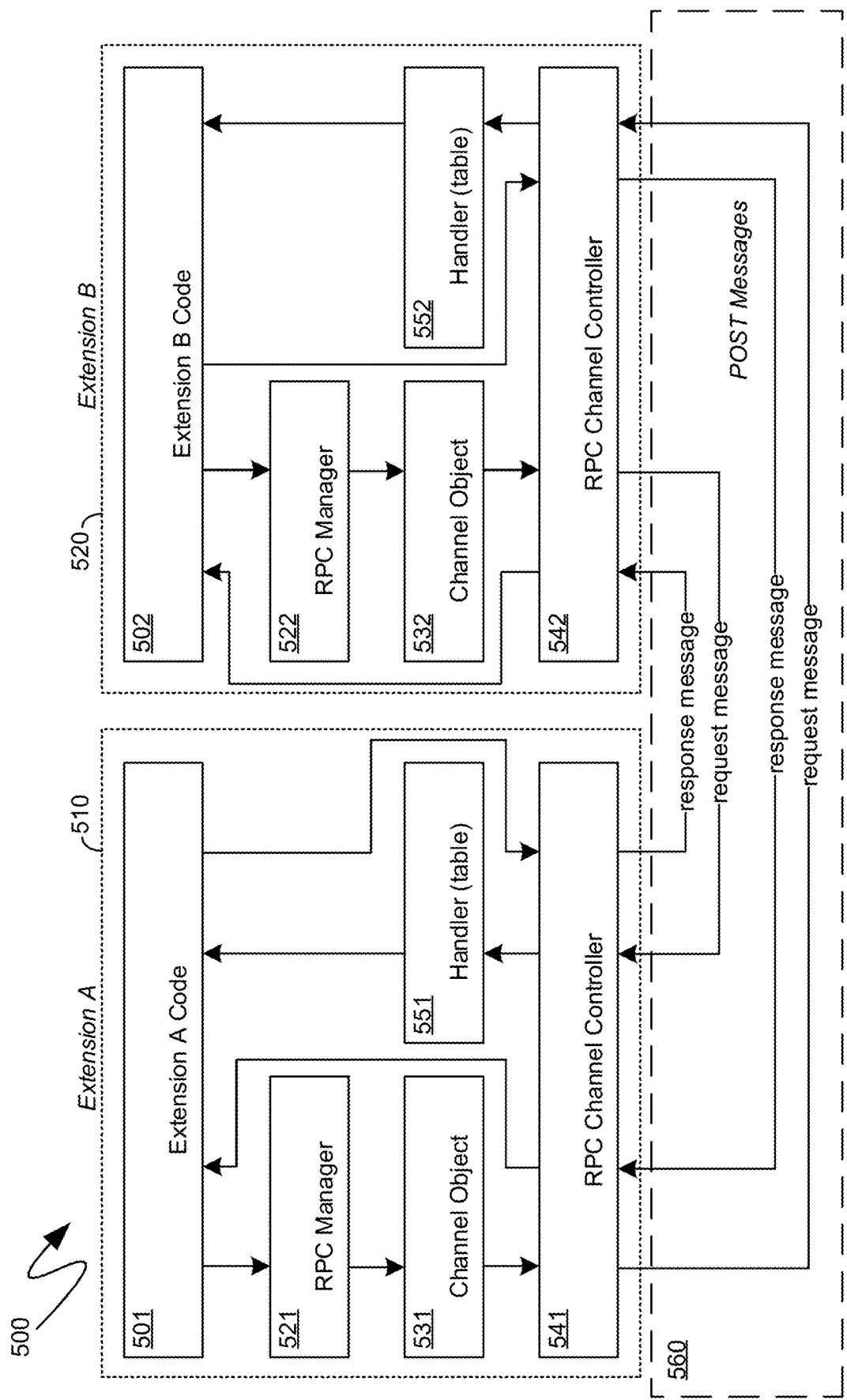
FIG. 5 is a flow diagram of an exemplary series of steps for providing isolated extensibility for a webpage.

Turning to FIG. 5, one mechanism for utilizing cross-document messages to communicate with extensions in inline frames is illustrated with reference to so-called "POST messages" 560. according to one aspect an extension, such as the exemplary extension 510, can comprise extension code 501 that can seek to communicate utilizing POST messages 560 with the extension code 502 of another extension, such as the exemplary extension 520. To do so, each extension can establish a remote procedure call manager, such as the exemplary RPC manager 521 of the extension 510 and the exemplary RPC manager 522 of the extension 520. A communication from the extension code 501 can be provided to the RPC manager 521, which can create a channel object, such as the exemplary channel object 531 for transmitting such a message via the POST messages 560. The exemplary channel object 531 can comprise a sequence number stored in an indexing dictionary. Additionally, a handler, such as the exemplary handler 551 can be created to receive the corresponding response. The communication can then be transmitted between RPC channel controllers, such as the exemplary RPC channel controller 541 of the extension 510 and the exemplary RPC channel controller 542 of the extension 520. The message can then be received and provided to a handler, such as the exemplary handler 522, which can be an inbound request processor that can have been preregistered in advance to process a particular request. The response, such as from the extension code 502, can then be provided to the RPC channel controller 542 for transmission back to the RPC channel controller 541. Upon receipt by the RPC channel controller 541, the response can be provided to the previously registered handler 551 and, optionally, to the extension code 501. Upon receipt of such a response, corresponding channel object can be resolved, such as based on the sequence number or other like indexing information, thereby indicating that a response was received to the original message. Communications originating with the extension code 502 of the exemplary extension 520 can, in a similar manner, be passed to the RPC manager 522, which can create a channel object, such as the exemplary channel object 532, for transmitting messages via the POST messages 560, as well as creating an exemplary handler for receiving a corresponding response. In such a manner, functionality analogous to Remote Procedure Call (RPC) functionality can be provided utilizing POST message communication between inline frames in a webpage.

Figure 6:
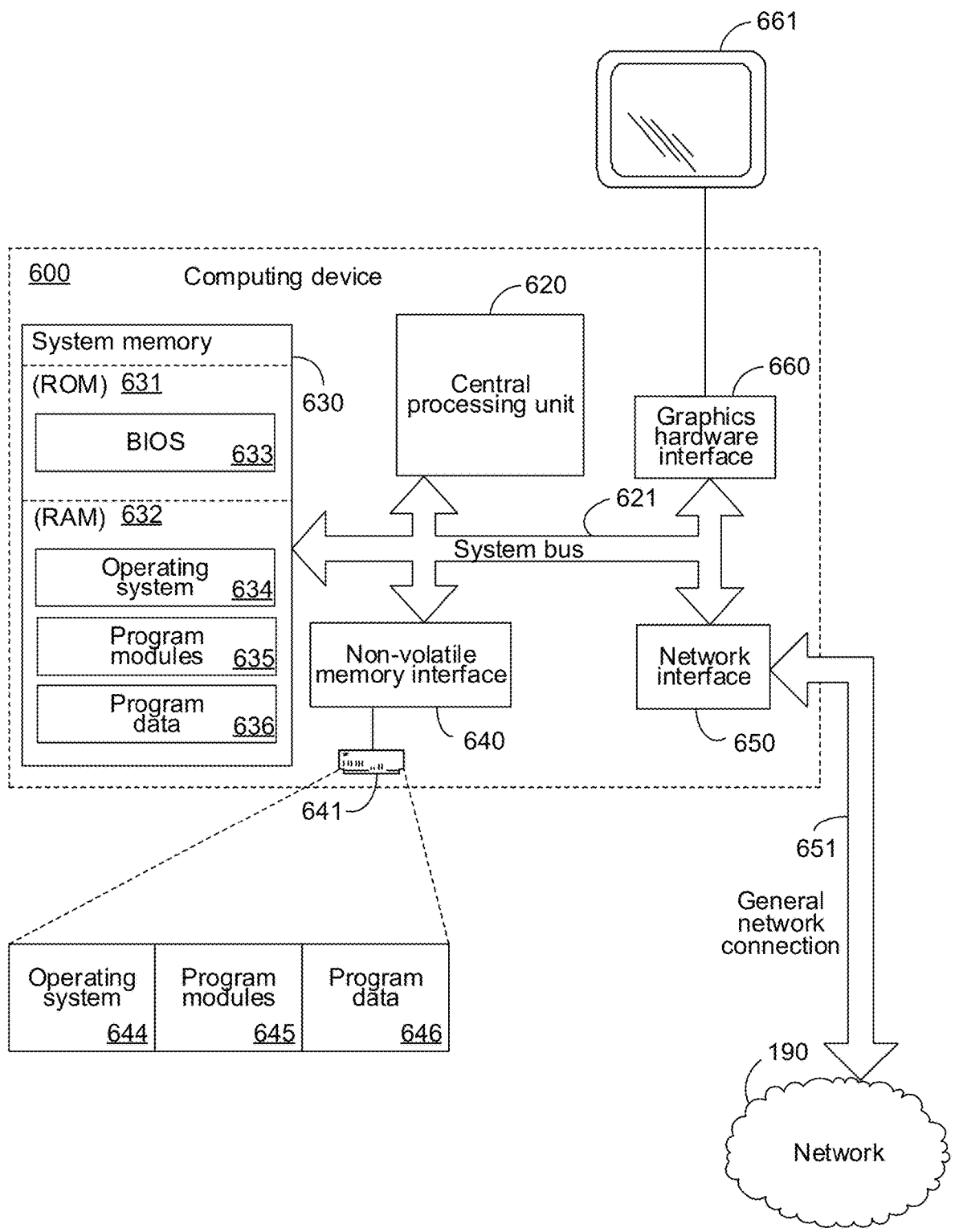
FIG. 6 is a block diagram of an exemplary computing device.

Turning to FIG. 6, an exemplary computing device 600 is illustrated which can perform some or all of the mechanisms and actions described above. The exemplary computing device 600 can include, but is not limited to, one or more central processing units (CPUs) 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. The computing device 600 can optionally include graphics hardware, including, but not limited to, a graphics hardware interface 660 and a display device 661, which can include display devices capable of receiving touch-based user input, such as a touch-sensitive, or multi-touch capable, display device. Depending on the specific physical implementation, one or more of the CPUs 620, the system memory 630 and other components of the computing device 600 can be physically co-located, such as on a single chip. In such a case, some or all of the system bus 621 can be nothing more than silicon pathways within a single chip structure and its illustration in FIG. 6 can be nothing more than notational convenience for the purpose of illustration.

The computing device 600 also typically includes computer readable media, which can include any available media that can be accessed by computing device 600 and includes both volatile and nonvolatile media and removable and non-removable media. By way of example, and not limitation, computer readable media may comprise computer storage media and communication media. Computer storage media includes media implemented in any method or technology for storage of content such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired content and which can be accessed by the computing device 600. Computer storage media, however, does not include communication media. Communication media typically embodies computer readable instructions, data structures, program modules or other data in a modulated data signal such as a carrier wave or other transport mechanism and includes any content delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer content between elements within computing device 600, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, other program modules 635, and program data 636.

The computing device 600 may also include other removable/non-removable, volatile/nonvolatile computer storage media. By way of example only, FIG. 6 illustrates a hard disk drive 641 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 641 is typically connected to the system bus 621 through a non-volatile memory interface such as interface 640.

The drives and their associated computer storage media discussed above and illustrated in FIG. 6, provide storage of computer readable instructions, data structures, program modules and other data for the computing device 600. In FIG. 6, for example, hard disk drive 641 is illustrated as storing operating system 644, other program modules 645, and program data 646. Note that these components can either be the same as or different from operating system 634, other program modules 635 and program data 636. Operating system 644, other program modules 645 and program data 646 are given different numbers hereto illustrate that, at a minimum, they are different copies.

The computing device 600 may operate in a networked environment using logical connections to one or more remote computers. The computing device 600 is illustrated as being connected to the general network connection 651 (to a network 652) through a network interface or adapter 650, which is, in turn, connected to the system bus 621. In a networked environment, program modules depicted relative to the computing device 600, or portions or peripherals thereof, may be stored in the memory of one or more other computing devices that are communicatively coupled to the computing device 600 through the general network connection 661. It will be appreciated that the network connections shown are exemplary and other means of establishing a communications link between computing devices may be used.

Although described as a single physical device, the exemplary computing device 600 can be a virtual computing device, in which case the functionality of the above-described physical components, such as the CPU 620, the system memory 630, the network interface 660, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 600 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example a system comprising: a first computer-readable storage medium having stored thereon a webpage comprising instructions which, when the webpage is loaded by a browser application program, cause the browser to: provide a manifest associated with the webpage to an extensibility platform script being executed by the browser, the manifest comprising information regarding extensions that extend a webpage's functionality while executing independently of the webpage whose functionality the extensions extend; receive, from the extensibility platform script being executed by the browser, a first list of extensions that can extend the webpage; select a first extension from the first list; create a first inline frame within a display of the webpage being rendered by the browser; provide a first inline frame identifier identifying the first inline frame and a first extension identifier identifying the first extension to the extensibility platform script being executed by the browser; and generate a cross-document message to the first extension being rendered within the first inline frame subsequent to receiving a first notification from the extensibility platform script being executed by the browser that the first extension is ready to receive messages; and a second computer-readable storage medium having stored thereon the extensibility platform script, in an extensibility platform script file, the extensibility platform script comprising instructions which, when executed by the browser, cause the browser to: search the manifest to determine which extensions can extend the webpage, the determining being based on an extension's enumeration, in the manifest, comprising an identification of the webpage; generate, based on the determining, the first list of extensions; instantiate the first extension, identified by the first extension identifier, in the first inline frame identified by the first inline frame identifier; and generate the first notification that the first extension is ready to receive messages.

A second example is the system of the first example, wherein the webpage comprises further instructions which, when the webpage is loaded by the browser, cause the browser to request a list of extensions that can extend the webpage; wherein the searching of the manifest, by the extensibility platform script being executed by the browser, is performed in response to the request.

A third example is the system of the first example, wherein the first inline frame identifier is a first document object model identifier of a first document object model object that corresponds to the first inline frame.

A fourth example is the system of the first example, wherein the cross-document message to the first extension comprises an identification of other extensions instantiated in other inline frames within the display of the webpage being rendered by the browser.

A fifth example is the system of the first example, wherein the first extension is instantiated from a first target path relative to a first origin uniform resource locator, the first target path being specified in an enumeration of the first extension in the manifest.

A sixth example is the system of the first example, wherein the first extension is instantiated from a first domain that is different from, and independent of, a domain associated with the first computer-readable storage medium that has stored thereon the webpage.

A seventh example is the system of the first example, wherein the first extension is a second webpage comprising instructions which, when the second webpage is loaded by the browser in the first inline frame, cause the browser to request, from the extensibility platform script being executed by the browser, a list of extensions that can extend the second webpage.

An eighth example is the system of the first example, wherein the extensibility platform script comprises further instructions which, when executed by the browser, cause the browser to notify the first extension that it will be terminated in response to receiving, from the webpage loaded by the browser, an instruction to terminate the first extension.

A ninth example is the system of the first example, further comprising a server computing device communicationally coupled to the first computer-readable storage medium and the second computer-readable storage medium, the server computing device comprising: one or more processing units; and one or more server computer-readable storage media having stored thereon computer-executable instructions which, when executed by the one or more processing units, cause the server computing device to: parse the webpage to identify extensions invoked by the webpage, the parsing identifying the first extension; obtain a manifest associated with the first extension; and copy the manifest associated with the first extension into the manifest associated with the webpage.

A tenth example is the system of the ninth example, wherein the first extension is another webpage; and wherein further the one or more server computer-readable storage media have further stored thereon computer-executable instructions which, when executed by the one or more processing units, cause the server computing device to: parse the other webpage to identify extensions invoked by the other webpage, the parsing identifying a second extension; obtain a manifest associated with the second extension; copy the manifest associated with the second extension into the manifest associated with the first extension prior to the copying the manifest associated with the first extension into the manifest associated with the webpage.

An eleventh example is a system comprising: a first computer-readable storage medium having stored thereon an extensibility platform script, in an extensibility platform script file, the extensibility platform script comprising instructions which, when executed by a browser application program, cause the browser to: search a provided manifest to determine which extensions can extend a webpage with which the manifest is associated, the determining being based on an extension's enumeration, in the manifest, comprising an identification of the webpage, the manifest comprising information regarding extensions that extend a webpage's functionality while executing independently of the webpage whose functionality the extensions extend; generate, based on the determining, a first list of extensions that can extend the webpage; instantiate a first extension in a first inline frame created within a display of the webpage being rendered by the browser; and generate a first notification that the first extension is ready to receive messages; and a server computing device comprising: one or more processing units; and one or more server computer-readable storage media having stored thereon computer-executable instructions which, when executed by the one or more processing units, cause the server computing device to: parse the webpage to identify extensions invoked by the webpage, the parsing identifying the first extension; obtain a manifest associated with the first extension; and copy the manifest associated with the first extension into the manifest associated with the webpage.

A twelfth example is the system of the eleventh example, wherein the first extension is instantiated from a first target path relative to a first origin uniform resource locator, the first target path being specified in an enumeration of the first extension in the manifest.

A thirteenth example is the system of the eleventh example, wherein the first extension is a second webpage comprising instructions which, when the second webpage is loaded by the browser in the first inline frame, cause the browser to request, from the extensibility platform script, as executed by the browser, a list of extensions that can extend the second webpage.

A fourteenth example is the system of the eleventh example, further comprising: a second computer-readable storage medium having stored thereon the webpage, the webpage comprising instructions which, when the webpage is loaded by the browser, cause the browser to: provide the manifest associated with the webpage to the extensibility platform script being executed by the browser; receive, from the extensibility platform script being executed by the browser, the first list; select the first extension from the first list; create the first inline frame within the display of the webpage being rendered by the browser; provide a first inline frame identifier identifying the first inline frame and a first extension identifier identifying the first extension to the extensibility platform script being executed by the browser; and generate a cross-document message to the first extension being rendered within the first inline frame subsequent to receiving the first notification from the extensibility platform script being executed by the browser that the first extension is ready to receive messages.

A fifteenth example is the system of the fourteenth example, wherein the first inline frame identifier is a first document object model identifier of a first document object model object that corresponds to the first inline frame.

A sixteenth example is the system of the fourteenth example, wherein the cross-document message to the first extension comprises an identification of other extensions instantiated in other inline frames within the display of the webpage being rendered by the browser.

A seventeenth example is the system of the fourteenth example, wherein the first extension is instantiated from a first domain that is different from, and independent of, a domain associated with the second computer-readable storage medium that has stored thereon the webpage.

An eighteenth example is a method of extending functionality, provided by instructions of a webpage that are executed by a browser application program when the webpage is loaded by the browser, with extensions that comprise instructions executed by the browser within an inline frame context and, therefore, independently of the browser's execution of the webpage's instructions, the method comprising: providing, by the webpage's instructions being executed by the browser, a manifest associated with the webpage to an extensibility platform script being executed by the browser, the manifest comprising information regarding the extensions; searching, by the extensibility platform script being executed by the browser, the manifest to determine which of the extensions can extend the webpage, the determining being based on an extension's enumeration, in the manifest, comprising an identification of the webpage;

generating, by the extensibility platform script being executed by the browser, the first list of extensions based on the determining; selecting, by the webpage's instructions being executed by the browser, a first extension from the first list; creating, by the webpage's instructions being executed by the browser, a first inline frame within a display of the webpage being rendered by the browser; instantiating, by the extensibility platform script being executed by the browser, the first extension in the first inline frame; generating, by the extensibility platform script being executed by the browser, a first notification that the first extension is ready to receive messages; and generating, by the webpage's instructions being executed by the browser, a cross-document message to the first extension being rendered within the first inline frame subsequent to receiving the first notification.

A nineteenth example is the method of the eighteenth example, wherein the cross-document message to the first extension comprises an identification of other extensions instantiated in other inline frames within the display of the webpage being rendered by the browser.

A twentieth example is method of the eighteenth example, wherein the first extension is a second webpage comprising instructions which are executed by the browser when the second webpage is loaded by the browser in the first inline frame, the method further comprising: requesting, by the second webpage's instructions being executed by the browser, from the extensibility platform script being executed by the browser, a list of extensions that can extend the second webpage.

As can be seen from the above descriptions, mechanisms for providing code isolation within webpage environments have been presented. In view of the many possible variations of the subject matter described herein, we claim as our invention all such embodiments as may come within the scope of the following claims and equivalents thereto.

We claim:

1. A system comprising:
   a first computer-readable storage medium having stored thereon a webpage comprising instructions which, when the webpage is loaded by a browser application program, cause the browser to:
   provide a manifest associated with the webpage to an extensibility platform script being executed by the browser, the manifest comprising information regarding extensions that extend a webpage's functionality while executing independently of the webpage whose functionality the extensions extend;
   receive, from the extensibility platform script being executed by the browser, a first list of extensions that can extend the webpage;
   select a first extension from the first list;
   create a first inline frame within a display of the webpage being rendered by the browser;
   provide a first inline frame identifier identifying the first inline frame and a first extension identifier identifying the first extension to the extensibility platform script being executed by the browser; and
   generate a cross-document message to the first extension being rendered within the first inline frame subsequent to receiving a first notification from the extensibility platform script being executed by the browser that the first extension is ready to receive messages; and
   a second computer-readable storage medium having stored thereon the extensibility platform script, in an extensibility platform script file, the extensibility platform script comprising instructions which, when executed by the browser, cause the browser to:
   search the manifest to determine which extensions can extend the webpage, the determining being based on an extension's enumeration, in the manifest, comprising an identification of the webpage;
   generate, based on the determining, the first list of extensions;
   instantiate the first extension, identified by the first extension identifier, in the first inline frame identified by the first inline frame identifier; and
   generate the first notification that the first extension is ready to receive messages.

2. The system of claim 1, wherein the webpage comprises further instructions which, when the webpage is loaded by the browser, cause the browser to request a list of extensions that can extend the webpage; wherein the searching of the manifest, by the extensibility platform script being executed by the browser, is performed in response to the request.

3. The system of claim 1, wherein the first inline frame identifier is a first document object model identifier of a first document object model object that corresponds to the first inline frame.

4. The system of claim 1, wherein the cross-document message to the first extension comprises an identification of other extensions instantiated in other inline frames within the display of the webpage being rendered by the browser.

5. The system of claim 1, wherein the first extension is instantiated from a first target path relative to a first origin uniform resource locator, the first target path being specified in an enumeration of the first extension in the manifest.

6. The system of claim 1, wherein the first extension is instantiated from a first domain that is different from, and independent of, a domain associated with the first computer-readable storage medium that has stored thereon the webpage.

7. The system of claim 1, wherein the first extension is a second webpage comprising instructions which, when the second webpage is loaded by the browser in the first inline frame, cause the browser to request, from the extensibility platform script being executed by the browser, a list of extensions that can extend the second webpage.

8. The system of claim 1, wherein the extensibility platform script comprises further instructions which, when executed by the browser, cause the browser to notify the first extension that it will be terminated in response to receiving, from the webpage loaded by the browser, an instruction to terminate the first extension.

9. The system of claim 1, further comprising a server computing device communicationally coupled to the first computer-readable storage medium and the second computer-readable storage medium, the server computing device comprising:
   one or more processing units; and
   one or more server computer-readable storage media having stored thereon computer-executable instructions which, when executed by the one or more processing units, cause the server computing device to:
   parse the webpage to identify extensions invoked by the webpage, the parsing identifying the first extension;
   obtain a manifest associated with the first extension; and
   copy the manifest associated with the first extension into the manifest associated with the webpage.

10. The system of claim 9, wherein the first extension is another webpage; and wherein further the one or more server computer-readable storage media have further stored thereon computer-executable instructions which, when executed by the one or more processing units, cause the server computing device to:

parse the other webpage to identify extensions invoked by the other webpage, the parsing identifying a second extension;

obtain a manifest associated with the second extension;

copy the manifest associated with the second extension into the manifest associated with the first extension prior to the copying the manifest associated with the first extension into the manifest associated with the webpage.

11. A system comprising:

a first computer-readable storage medium having stored thereon an extensibility platform script, in an extensibility platform script file, the extensibility platform script comprising instructions which, when executed by a browser application program, cause the browser to:

search a provided manifest to determine which extensions can extend a webpage with which the manifest is associated, the determining being based on an extension's enumeration, in the manifest, comprising an identification of the webpage, the manifest comprising information regarding extensions that extend a webpage's functionality while executing independently of the webpage whose functionality the extensions extend;

generate, based on the determining, a first list of extensions that can extend the webpage;

instantiate a first extension in a first inline frame created within a display of the webpage being rendered by the browser; and generate a first notification that the first extension is ready to receive messages; and a server computing device comprising:

one or more processing units; and one or more server computer-readable storage media having stored thereon computer-executable instructions which, when executed by the one or more processing units, cause the server computing device to:

parse the webpage to identify extensions invoked by the webpage, the parsing identifying the first extension;

obtain a manifest associated with the first extension; and copy the manifest associated with the first extension into the manifest associated with the webpage.

12. The system of claim 11, wherein the first extension is instantiated from a first target path relative to a first origin uniform resource locator, the first target path being specified in an enumeration of the first extension in the manifest.

13. The system of claim 11, wherein the first extension is a second webpage comprising instructions which, when the second webpage is loaded by the browser in the first inline frame, cause the browser to request, from the extensibility platform script, as executed by the browser, a list of extensions that can extend the second webpage.

14. The system of claim 11, further comprising: a second computer-readable storage medium having stored thereon the webpage, the webpage comprising instructions which, when the webpage is loaded by the browser, cause the browser to:

provide the manifest associated with the webpage to the extensibility platform script being executed by the browser;

receive, from the extensibility platform script being executed by the browser, the first list;

select the first extension from the first list;

create the first inline frame within the display of the webpage being rendered by the browser;

provide a first inline frame identifier identifying the first inline frame and a first extension identifier identifying the first extension to the extensibility platform script being executed by the browser; and generate a cross-document message to the first extension being rendered within the first inline frame subsequent to receiving the first notification from the extensibility platform script being executed by the browser that the first extension is ready to receive messages.

15. The system of claim 14, wherein the first inline frame identifier is a first document object model identifier of a first document object model object that corresponds to the first inline frame.

16. The system of claim 14, wherein the cross-document message to the first extension comprises an identification of other extensions instantiated in other inline frames within the display of the webpage being rendered by the browser.

17. The system of claim 14, wherein the first extension is instantiated from a first domain that is different from, and independent of, a domain associated with the second computer-readable storage medium that has stored thereon the webpage.

18. A method of extending functionality, provided by instructions of a webpage that are executed by a browser application program when the webpage is loaded by the browser, with extensions that comprise instructions executed by the browser within an inline frame context and, therefore, independently of the browser's execution of the webpage's instructions, the method comprising:

providing, by the webpage's instructions being executed by the browser, a manifest associated with the webpage to an extensibility platform script being executed by the browser, the manifest comprising information regarding the extensions;

searching, by the extensibility platform script being executed by the browser, the manifest to determine which of the extensions can extend the webpage, the determining being based on an extension's enumeration, in the manifest, comprising an identification of the webpage;

generating, by the extensibility platform script being executed by the browser, the first list of extensions based on the determining;

selecting, by the webpage's instructions being executed by the browser, a first extension from the first list;

creating, by the webpage's instructions being executed by the browser, a first inline frame within a display of the webpage being rendered by the browser;

instantiating, by the extensibility platform script being executed by the browser, the first extension in the first inline frame;

generating, by the extensibility platform script being executed by the browser, a first notification that the first extension is ready to receive messages; and generating, by the webpage's instructions being executed by the browser, a cross-document message to the first extension being rendered within the first inline frame subsequent to receiving the first notification.

19. The method of claim 18, wherein the cross-document message to the first extension comprises an identification of other extensions instantiated in other inline frames within the display of the webpage being rendered by the browser.

20. The method of claim 18, wherein the first extension is a second webpage comprising instructions which are executed by the browser when the second webpage is loaded by the browser in the first inline frame, the method further comprising:

requesting, by the second webpage's instructions being executed by the browser, from the extensibility platform script being executed by the browser, a list of extensions that can extend the second webpage.

\* \* \* \* \*